United States Patent [19]
Cragun et al.

[11] Patent Number: 5,127,045
[45] Date of Patent: Jun. 30, 1992

[54] IDENTIFYING TELEPHONE CONTROLLER SYSTEM

[76] Inventors: David R. Cragun; John R. Irwin, both of 1117 E. Country Hills Dr., #8-B, Ogden, Utah 84403

[21] Appl. No.: 437,127

[22] Filed: Nov. 16, 1989

[51] Int. Cl.$^5$ .................. H04M 1/60; H04M 1/64; H04M 1/72; H04M 11/02
[52] U.S. Cl. .................................. 379/88; 379/105; 379/160; 379/375; 379/395; 379/442
[58] Field of Search ............ 379/66, 67, 88, 105, 379/160, 159, 387, 395, 442, 441, 327, 332, 375

[56] References Cited

U.S. PATENT DOCUMENTS

| | | | |
|---|---|---|---|
| 3,534,161 | 10/1970 | Friesen et al. . | |
| 3,964,048 | 6/1976 | Lusk et al. | 340/310 R |
| 3,990,012 | 11/1976 | Karnes . | |
| 4,057,829 | 11/1977 | Moorehead | 358/86 |
| 4,058,678 | 11/1977 | Duran et al. | 379/66 X |
| 4,106,007 | 8/1978 | Johnston et al. | 340/310 A |
| 4,174,517 | 11/1979 | Mandel | 340/310 A |
| 4,185,272 | 1/1980 | Feiker . | |
| 4,217,646 | 8/1980 | Caltagirone et al. | 364/493 |
| 4,348,657 | 9/1982 | Merkel | 340/310 R |
| 4,362,905 | 12/1982 | Ismail | 379/442 |
| 4,386,436 | 5/1983 | Kocher et al. | 455/151 |
| 4,393,278 | 7/1983 | Miyoshi . | |
| 4,409,439 | 10/1983 | Gamble . | |
| 4,429,188 | 1/1984 | Allen . | |
| 4,442,319 | 4/1984 | Treidl | 379/105 |
| 4,446,334 | 5/1984 | Groff . | |
| 4,453,041 | 6/1984 | Castro et al. . | |
| 4,459,434 | 7/1984 | Benning et al. . | |
| 4,467,144 | 8/1984 | Wilkerson et al. . | |
| 4,488,005 | 12/1984 | Frantz . | |
| 4,491,690 | 1/1985 | Daley | 379/105 |
| 4,503,288 | 3/1985 | Kessler | 379/67 |
| 4,508,937 | 4/1985 | Burger et al. . | |
| 4,538,031 | 8/1985 | Benning et al. . | |
| 4,546,211 | 10/1985 | Fane, III . | |
| 4,546,213 | 10/1985 | Dick . | |
| 4,552,993 | 11/1985 | Hales . | |
| 4,554,411 | 11/1985 | Armstrong . | |
| 4,567,330 | 1/1986 | Curtin . | |
| 4,578,540 | 3/1986 | Borg et al. | 379/40 |
| 4,580,011 | 4/1986 | Glaser . | |
| 4,584,434 | 4/1986 | Hashimoto . | |
| 4,607,139 | 8/1986 | Froment et al. | 379/399 |
| 4,608,458 | 8/1986 | Hashimoto . | |
| 4,658,416 | 4/1987 | Tanaka | 379/57 |
| 4,674,115 | 6/1987 | Kaleita et al. | 379/201 |
| 4,675,668 | 6/1987 | Ise et al. | 340/825.08 |
| 4,782,245 | 11/1988 | Henry | 307/147 |
| 4,845,743 | 7/1989 | Lutz | 379/199 |

FOREIGN PATENT DOCUMENTS 0028267 2/1986 Japan .................................... 379/105

OTHER PUBLICATIONS

"C$^3$I for the homeowner", J. Horgan, *IEEE Spectrum*, May, 1985, pp. 46-48.

Primary Examiner—Thomas W. Brown
Attorney, Agent, or Firm—Madson & Metcalf

[57] ABSTRACT

An identifying telephone controller system using a main computer component with a central processing unit coupled to an in-house AC wiring system and utilizing a plug-in ringer/appliance controller receive and a base-remote telephone system to provide multi-function telephone operations including caller identification and call patching and remote appliance control.

32 Claims, 6 Drawing Sheets

IDENTIFYING TELEPHONE CONTROLLER SYSTEM

FIELD OF THE INVENTION

The present invention relates to multi-function telephone communications systems and particularly to systems which discriminate between various incoming calls or direct calls to particular locations.

PRIOR ART

There are a number of devices known of prior art that are designed to intercept an incoming telephone call and to determine, based upon a wide variety of criteria, whether the call should be forwarded to a particular person or station. These systems are designed to prevent a caller from achieving access to a call addressee unless certain prescribed conditions, or, at the very least, until the call addressee is provided with information regarding the origin of the call and/or the identity of the caller. For example, U.S. Pat. No. 4,508,937 (Burger, et al) discloses a device that can give a call addressee a different ringing scheme depending upon the location of the origin of the incoming call. The objective of the Burger, et al device is to increase the number of available ringing codes, which, in turn, increase the capacity of the system. The patented device is limited, however, by the capability of the system to determine the origin of an incoming call. By way of illustration, calls originating outside of the building may use different types of telephone lines than do internal calls. Accordingly, it is a relatively simple matter to give a particular phone of a call addressee a different ringing scheme for a call originating from some external source.

Other devices or systems used for screening incoming calls include U.S. Pat. Nos. 4,393,278 (Miyosh); 4,429,188 (Allen); 4.446,334 (Groff); 4,453,041 (Castro, et al); and 4,488,005 (Frantz). All of the above devices have another serious limitation. That is, they all rely on changing the ringing scheme in a particular phone. The same limitation occurs in known personalized ringing schemes. That is, they are specific to a particular location rather than to a specific person and have different ringing schemes for different call addressees that still depend upon modifications associated with a particular phone. This is also true of the modified annunciator system disclosed in U.S. Pat. No. 4,409,439 (Gamble). All of the devices disclosed in the prior art, being specific to a given phone or phones, operate on the assumption that a call addressee is near a particular phone or phones. In many applications it is desirable to have a telephone system that can notify a person that a specific call is for him without the call addressee necessarily being near a specific phone or even any phone at all. The known prior art devices do not have this capability.

Another technique employed in the prior art to restrict calls to a receiving party involves the use of add-on codes which must accompany an incoming call. The devices employed automatically intercept a call and require the caller to enter a specific add-on code after dialing the usual telephone number before the call addressee's phone will be allowed to ring. In U.S. Pat. No. 4,429,190 (Allen) desired calls are identified by use of two digit add-on codes known only to persons selected by the user. A similar device is shown in U.S. Pat. No. 4,393,278 (Miyashi). These systems are limited in application because each "desired caller" must have an add-on code that has been previously given to the caller by the particular call addressee. Variations on this theme are disclosed in U.S. Pat. Nos. 4,453,041 (Castro, et al) and 4,446,334 (Groff). While suitable for some uses these devices are unacceptable for general usage. For example, a call directed to a specific employee in a business requires each caller to know the correct code. In such a system the code would have to be published, thus resulting in a scheme that resembles extension numbers and similar systems. See also, U.S. Pat. No. 4,488,005 (Frantz).

These devices involving caller code entry are also specific to a particular phone. It is always assumed that the call addressee is close enough to the phone that he will hear the ringer when and if it is actuated. In summary, while the devices in the prior art are described in terms of "personalities" ringing schemes, in actuality they are specific to a given location, namely the location of a particular phone. In many applications it is desirable to have a telephone system that can notify a person that a specific call is for him without the call addressee necessarily being near a particular phone. None of the devices disclosed in the prior art have this capability.

In the past it has also been known that telephone systems have been utilized to remotely control home appliances. Generally, such control has been effected through wires coupling the telephone circuitry directly to the appliance being controlled. In U.S. Pat. No. 4,442,319 (Treidl), however, a telephone system based controller that utilizes the AC power lines of a building is disclosed.

In Treidl, a controller which actuates various electronic appliances can have the actuating times altered by way of the telephone system. The controller is programmed to actuate the various appliances at different times. Circuitry is provided to allow a telephone, through the use of a local dial tone multi-frequency (DTMF) circuit (which may be a local telephone) to call the controller and alter the controller program. The Treidl device is not readily adaptable for the call intercept and ringer system that is the object of the present invention. In Treidl, the appliance control circuit receives a given code signal by way of the AC power lines and if it matches a preselected code the appliance is turned on or off. No means is provided for the simultaneous usage of the incoming copied signal to operate a ringing scheme. The present invention contemplates a method for performing this operation.

It is of concern that remote controllers such as disclosed by Treidl may be subject to operation by stray signals or may be adversely affected by radio and/or electromotive interference.

OBJECTS OF THE INVENTION

Principal objects of the invention are to provide multi-function, versatile telephone system that is reliable and economical to produce and use.

Other, more specific objects are to provide a telephone system that will make each telephone connected to the system a "smart phone"; that will specifically identify an intended recipient of a call by a unique ringing sequence not requiring a generally unknown add-on code; that will provide unique caller identification wherein a call recipient can hear the caller's voice; that will allow for immediate remote control of appliances and warning devices or for the operation of such appliances and other devices on a programmed time schedule; that will permit interrogation of household conditions, as natural gas usage from remote stations; that will provide for intercom capabilities within a building or related buildings; that can be used to restrict incoming calls by using a programmed access code, if desired; that has hold capabilities to allow the calling party to be placed on hold while the receiving party moves to another telephone or performs other system functions; that will provide individual call directing, whereby a call for an individual recipient will be intercepted and the caller will be given a forwarding number for the individual, and with the forwarding number being updated through the telephone system; that includes call patching; that provides for last number redial by any telephone used in the system, whether or not such telephone is itself designed for such use; that provides for automatic redialing at predetermined time intervals and for a selected length of time, with the user of the system being alerted each time a call attempt is made and when the call is completed; that provides for memory dial numbers, also by any telephone in the system, whether or not the telephone set itself is designed for such use; that will provide for "lock-out" of selected pre-fix telephone numbers and of unauthorized long distance calling; that will automatically respond to emergency situations, such as smoke detection, unauthorized entry, etc., to notify a person or organization of the existence and location of the emergency; that may have voice programming to insure ease of usage by any user of the system; and that provides for the receipt and retention of messages to be retrieved by any potential callee or to be identified as being only for a particular callee and provided only to such individual callee upon entry of his particular access code.

Still other objects are to provide a telephone system utilizing a modular telephone adapter to interconnect normally wired telephones to the A+ and A− lines. With the adapter the usual A+ and A− lines of a four line in-house conductor cable are connected to the "tip" and "ring" pair of the lines of the four wire conductor to which the telephone company line is also connected.

Yet other objects are to provide a telephone system that can be used with a base portable fixed or combination telephone system in lieu of use with in-house A.C. wiring and that will have caller identification and discrimination and call patching.

FEATURES OF THE INVENTION

A principal feature of the invention comprises a means for summoning a called party (callee) to the telephone by ring sequences generated from signal receivers. The signal receivers each comprise a central processing unit (CPU) which controls a speech synthesizer and a dual tone multiple frequency (DTMF) encoder/decoder (E/D) module. A telephone interface, which works as a "smart connect", intercepts incoming calls to a particular group of telephones and directs the call signal to the DTMF E/D module where it is decoded and sent to the CPU. The CPU sends code signals from its permanent memory to the speech synthesizer which gives the caller specific directions regarding how to have the call redirected to a specific call addressee by entering, by way of the telephone DTMF keyboard, a number of letters associated with a call addressee's name. This new incoming signal is decoded by the DTMF E/D module and sent to the CPU which, by way of an internal memory recognizes the incoming code and sends a coded signal to an AC modulator such as a pulsed oscillator, which in turn puts a signal onto the AC wiring where it travels to a ringer/appliance controller receiver assembly. A modified DTMF keyboard is used to program the CPU such that a distinctive ringing code results for each call addressee. A particular call addressee can then hear his own ring sequence and can pick up any phone connected to the system to answer the call.

A mode control circuit comprising a logic switch network is used, by way of the CPU, to control the number of rings associated with an incoming call before the call is intercepted.

Another particular feature of this telephone system is that appliances plugged into the ringer/appliance controller receiver can be remotely controlled. This is accomplished by calling the system and entering the Utility mode by way of DTMF signals which are received by the system. The CPU then again sends code to the Speech synthesizer to give instruction to the caller on controlling an appliance. When the proper DTMF codes are received, i.e., those that match pre-programmed data of a particular appliance, the CPU sends control codes through the AC interface to the ringer/appliance controller which decodes those codes to control the on/off state of the appliance.

With the addition of a conventional battery back up memory system, which includes a real-time clock, (not shown) a clock feature is added which allows timed appliance control. Thus, appliances or other devices can be remotely programmed to operate on a timed sequence.

Still another feature of the present system makes it possible for the caller to redirect his call to another telephone designated by the callee. Through any telephone attached to the system the callee may enter his forwarding number with the DTMF, or rotary signal into the CPU memory, which may then be received by the caller when the caller enters the name of the callee into the system. Likewise, the callee may enter a forwarding number through any DTMF telephone outside the system. The CPU obtains the directing data from its system memory and sends the signals necessary for the speech synthesizer to give the forwarding number where the callee may be reached.

Calls may be patched through the system by a caller who has been given the proper access code if the owner of the system has subscribed to call conferencing offered by the telephone company. Upon entering a Call Patch mode, by way of DTMF tones, into the system the caller is asked, by the speech synthesizer, to enter his access code to continue. Upon entering the proper access code the caller is asked to enter the number. The system then does a flash of the hook switch relay to access the other line, (call conferencing line) dials that number, and then flashes the hook switch relay to connect both parties together. This is initiated by the caller from a remote location.

The present system provides for intercom use of all telephones attached to the system. A user may pick up any attached telephone and dial "0", whereupon the CPU sends signals to the speech synthesizer which acknowledge the intercom mode. The user may then dial either DTMF or rotary, the name of the person to whom he wishes to speak. The CPU compares these dialed DTMF or Rotary codes with name codes that have been pre-programmed into memory and upon finding a match in name codes the CPU sends a ring sequence code signal through the AC interface to ringer/appliance controller receivers attached to the AC line which decode the code sequence and sound out the identifying ring sequence through a speaker. The callee for whom the communication was intended then simply goes to the nearest telephone location and picks it up to communicate with the user.

The present system also limits long distance calls when programming has actuated the limit dial mode. Any user who dials a "1" or a "0" or any other pre-programmed sequence is asked for an access code before being allowed to dial long distance. This is accomplished when the DTMF/rotary decoder sends the decoded signal to the CPU which is compared with "1" or "0" or the pre-programmed sequence (example "900" or "976"). If the comparison matches then the CPU sends signals to the speech synthesizer which asks the user on the phone for their access code to use long distance. The user then enters the access code on the DTMF keypad or rotary dial. The DTMF/rotary module sends this code to the CPU which is compared against codes in its memory. If the code does not match then the CPU switches the phone interface relays to a disconnect condition so no long distance call may be made. Then the CPU sends a code signal through the AC interface to the ringer/appliance control receivers which decode the signal and sounds an alarm on the speaker which informs people that there is an unauthorized user trying to make long distance calls.

An auto-dial feature is also part of the present system. The AC interface completes the communication link that is necessary when the auto-dial feature is initiated. With this feature the user may move away from the telephone on which the auto-dial call is initiated and still know the status of the call. The system automatically dials the last number dialed when the user pushes a DTMF key starting the sequence. The CPU receives the DTMF or rotary signal from the DTMF/rotary E/D module and upon receiving this signal it automatically redials the last number dialed thru signals sent the DTMF E/D module. The DTMF E/D allows continual monitoring of the call status of the dialed number. Busy and answer signals are processed by the CPU and then passed on in the form of frequency modulated codes through the AC interface to the ringer/appliance controller receivers on the AC line. The receivers decode these signals to inform the user of the call status by sounds which are generated and heard over the speakers in the receivers. This allows the user to continue other activities while the system places the call. A timing sequence program times the calls and determines when to begin the next call sequence. This continues until the call is terminated by the user upon picking up a telephone or by the computer upon doing a predetermined number of automatic redial calls.

The present invention also features a form of memory dial which is considerably different from other known memory dial systems. When a memory dial call is made from other commonly available telephones, the call has to be made from a particular phone and the number to be dialed is typically selected from a number table relating to a particular key or sequence of numbers. The present system enables the user to call from any phone connected to his system and to place that call by simply dialing the first few letters of the name of the person that they wish to call. The numbers relating to that person's name are decoded by the DTMF/rotary E/D module and sent to the CPU which matches that name to the phone number which has been pre-programmed into memory. When data matches and the correct phone number is found the CPU then connects the user to the phone line and sends the proper signals to the DTMF/rotary E/D module and begins the dial sequence. This may be accomplished from any telephone connected to the system.

Another feature of the invention is that a caller may have a message for a callee that will subsequently be played back, using the voice synthesizer, when the callee calls into the system, the mode is actuated to enter the proper access code. With this feature a message can be available to any one of a group of individuals knowing the proper access code or can be restricted to receipt by a single individual having the proper access code.

The system of the invention can include voice directed programming to facilitate ready use even by untrained persons. A user, depresses the "program" key on the DTMF keyboard to activate the CPU to receive a signal through the input/output data port and by way of program control gathers voice data which is transferred to the speech synthesizer. The speech synthesizer is then actuated to speak such message or messages as may be appropriate to the mode sequence followed.

Other objects and features of the invention will become apparent from the following detailed description and drawings disclosing what are presently contemplated as being the best modes of the invention.

DETAILED DESCRIPTION OF THE DRAWINGS

Figure 1:
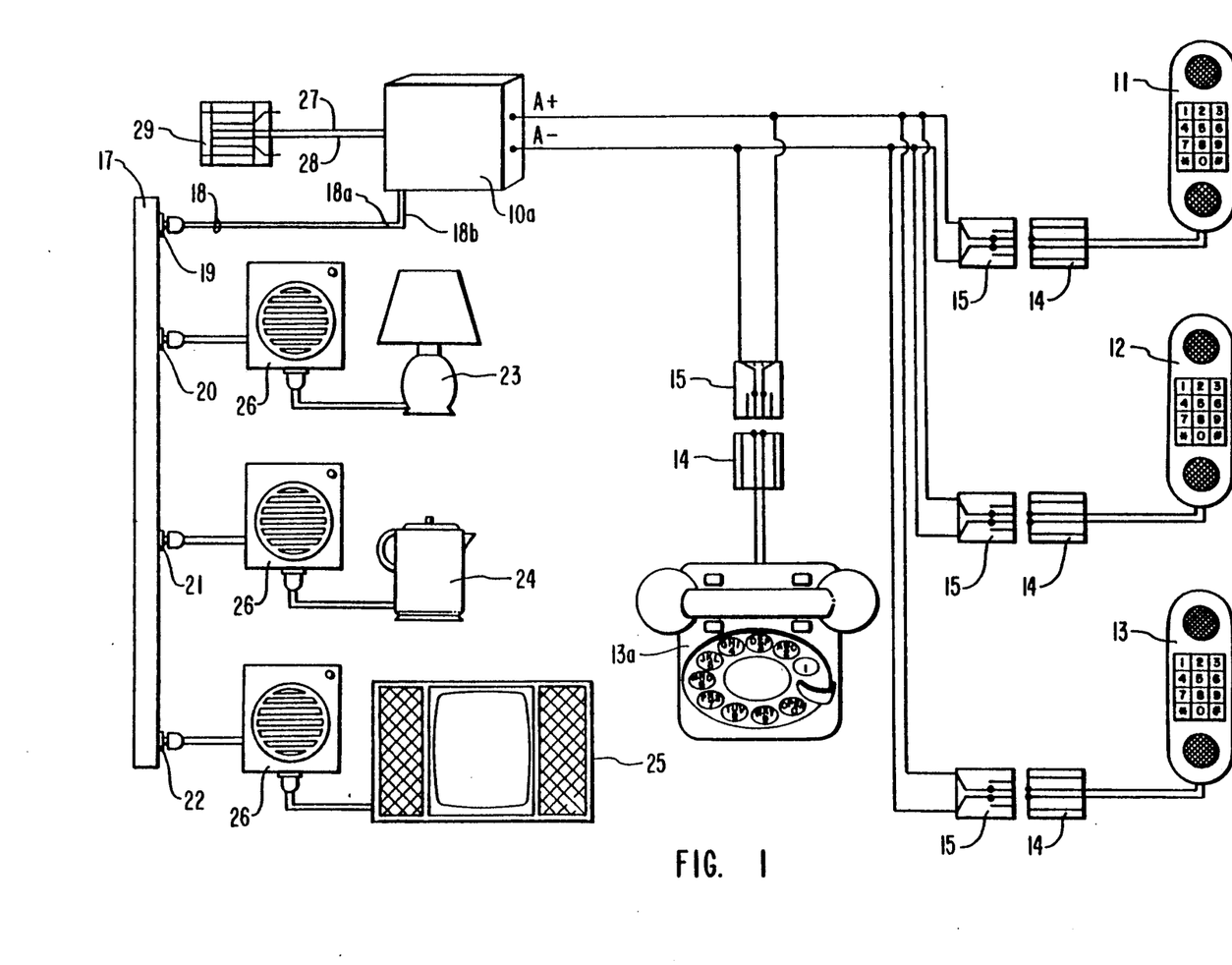
FIG. 1 is a block diagram of an overall typical system wiring diagram.

Referring now to the drawings:

In the illustrated preferred embodiment, the identifying telephone controller system of the invention is shown generally at 10 in FIG. 1. As shown, one or more telephones (here shown as three touch-tone telephones 11, 12 and 13 and one rotary dial telephone 13a) is each connected by way of a telephone interface plug 14 and a modular adapter 15, internal telephone wiring lines A+ and A−. The telephones 11-13a will be hereafter discussed as "touch-tone" type devices but it will be apparent that they may also be rotary dial telephones such as that shown at 13a.

The A+ and A− lines interconnect the telephones 11-13a and the identifying controller system 10 and lines 18a and 18b connect the identifying controller system 10 through an interface switch 10a to the 110 v AC wiring circuitry 17 of a building through a plug 18 and an outlet 19 of the building circuitry. Typically, other outlets 20, 21 and 22 of the circuitry 17 are adapted to receive various appliances, etc., such as the lamp 23, coffee pot 24 and entertainment center 25 that are plugged into the AC circuitry through a portable ringer/appliance controller receiver 26.

The interface switch 10a is connected to telephone company lines (not shown) through the usual "tip" and "ring" lines 27 and 28 and a modular plug 29, in conventional fashion.

Figure 2:
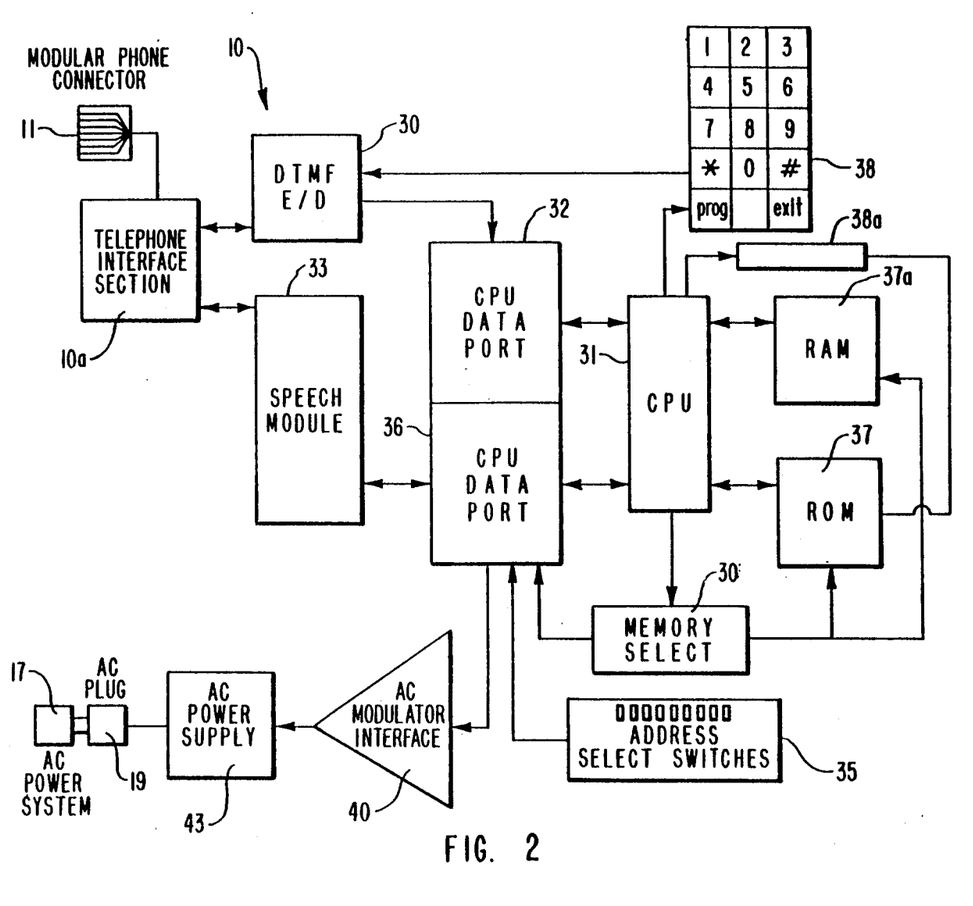
FIG. 2, a block diagram showing the main computer component of the system of the invention.

As best seen in FIG. 2, an incoming call from any telephone 11-13a (here shown as 11) provides a signal to the phone interface switch 10a of the identifying phone controller 10, which contains phone transformer, logic, and switching circuits to direct the incoming signal to a dual tone multiple frequency (DTMF) encoder/decoder (E/D) module 30, which is an available standard component commonly used for decoding touch-tone type signals.

It is preferred that the DTMF module 30 contain circuitry for use with both DTMF and a standard rotary dial telephone. After the incoming call signal is decoded by the DTMF E/D module 30 the resulting information is sent to a central processing unit (CPU) 31 through a CPU data port 32 which, by way of internal memory and programming, operates a speech module 33. The CPU 31 is used to control the many functions of the telephone control system 10. CPU 31 recognizes an incoming call signal and actuates the speech module 33 to provide a pre-programmed statement to a caller by way of the telephone interface switch 10a.

The number of incoming call signal rings that are received prior to speech module actuation is set by a CPU select input device such as option switches 35, which consist of simple switches that control input to another CPU data port 36 and CPU 31. The CPU 31 is programmed to acknowledge name and number data with DTMF data entered into the CPU 31 by the DTMF keyboard 38, which encodes the key number pressed. This DTMF coded signal is decoded for CPU 31 use by the DTMF E/D 30. The processor stores this program data for matching names and numbers which will be used later in the normal operation of the invention. For example, to enter the name "FRED" into the system a program sequence is followed by the programmer who first pushes the program key (prog) on the modified DTMF keyboard 38. This is decoded by the DTMF E/D module 30 and the CPU 31 receives this data through CPU Data Port 32 to start the program mode. During operation of the program mode the programmer enters the first three or four letters of the name "FRED" as "F R E" and follows with a number from 1 to 16 which relates to the ring sequence that will be used for identifying that person "FRED". The CPU 31 stores this name and ring code number for use at a later time, as will be further explained.

A liquid crystal display module 38a which is an available standard component, may be connected to the CPU 31 and by way of program control, from memory 37, will display program status of names and numbers stored into the system memory 37a.

The DTMF keyboard 38 is constructed such that a light is illuminated by the CPU 31 to indicate when a corresponding key has been pressed. This provides a positive feedback to the programmer that the correct key or sequence of keys has been pressed during programming. The DTMF keyboard 38 becomes a monitor of other DTMF keys pressed on local telephones attached to the system as well as from distant keys pressed on DTMF telephones which are calling into the system. The system is programmed to operate a speech module 65 with a speech synthesizer which is designed to simulate human speech and contains its own programmable capability.

After the CPU 31 actuates the speech module 33 to respond to an incoming call the caller is informed by the speech module 33 that the call has been intercepted by the system 10 and is told that to reach a particular individual the first three letters of the person's name (to follow the example) should be entered on the caller's telephone. The caller then enters "F R E", which is transmitted to the DTMF E/D module 30 for decoding and then to CPU 31. The data is provided to the CPU 31 with "F R E" representing a particular call addressee. CPU 31 makes a comparison to determine whether "F R E" is a valid call addressee and if so, it will then generate a ringing code which has been established for Fred. This code is sent to an AC modulator interface 40 which sends a pulse train onto the AC power line 17 of the building through the plug 19.

Figure 3:
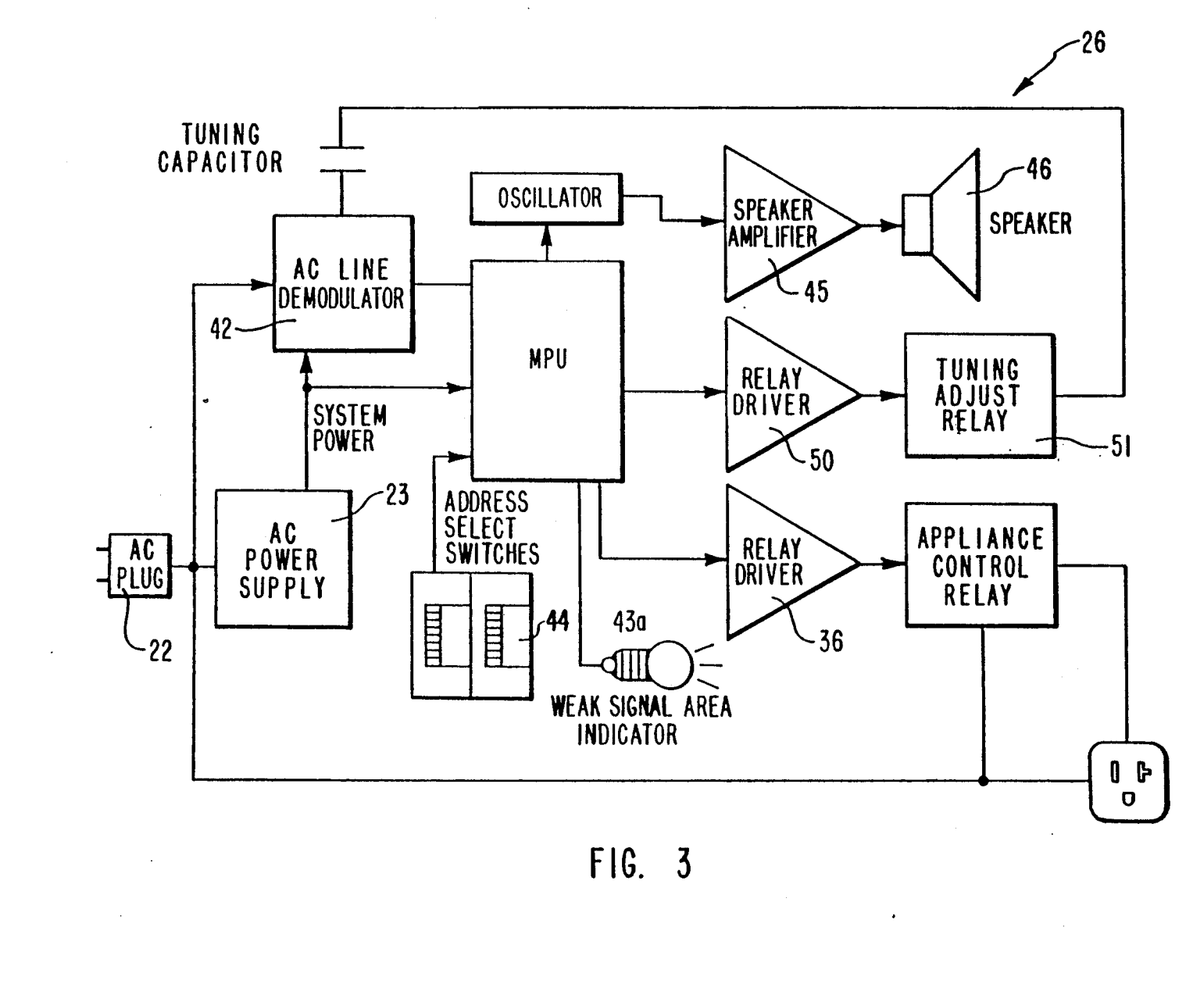
FIG. 3, a similar diagram of the ringer/appliance controller receiver.

A ringer/appliance controller receiver 26, which is connected by AC plug 41 into the same AC power line 17 by receiving plug 19, receives the pulse train through the AC line demodulator 42 which filters the code being received and cleans it up for a micro-processor with its own internal memory, i.e., MPU 43. The MPU 43 compares the code of the pulse train against address codes established by address select rotary switches 44 and upon finding a code match further compares the remaining command code data to direct the MPU 43 to ring a code to oscillate out to the amplifier 45 and speaker 46. An addressee hearing this ring code now knows that the call is specifically for him.

With previously known technology the telephone must be answered by a person before anyone can know who is calling or for whom the call is intended. With the present invention the communication link is broadened by including the AC building circuit into the process so that a telephone call may be answered without the person responding even hearing a telephone ring. The call is processed by the CPU 31 to allow the intended addressee to know that the call is for him before any personal response is made to answer the telephone.

Appliances are controlled in the system 10 in much the same way that a person is identified. Appliances can be given names and controlled as such by any telephone connected to the invention either locally on the system or remotely through a telephone company line. Typically, a user programmer can again enter the programming mode and then enter a "1" signal which specifies the utility mode, after which an appliance name can be entered. For example, a particular lamp 23 may be entered as "L I G" on the DTMF keyboard 38.

After LIG has been entered it is followed by entry of a two digit code which assigns "L I G" to a particular ringer/appliance controller receiver 26, i.e., the one associated with lamp 23. The CPU 31 stores this data to be used later as a name which can control a particular lamp 23 named (Light), by way of any connected or remotely connected telephone.

For security and safety reasons a caller may enter the appliance mode after entering an access code. When the proper code is entered the identifying phone controller 10 allows access into the appliance control mode and entry of an appliance name. If that appliance name matches the previous programmed name (example: "L I G" for light) then the CPU 31 sends code data out through its CPU data port 36 to AC modulator interface 40, which applies that signal to the AC power system 17 so that it can be received by the appropriate ringer/appliance controller receiver 26. This receiver 26 will demodulate the code signal and MPU 43 will compare that code with its individual address switches 44. If a match results the receiver will activate a relay driver 50 and appliance control relay 51 to a position opposite to that existent before actuation of the relay driver. The CPU 31, during this period, also gathers speech data from its ROM memory 37 that is consistent with the known condition, i.e., "on" or "off" of the controlled lamp. The speech data is then sent to speech module 33 and on out through the telephone interface section 10a to advise the caller of the condition of the appliance just activated. Additional activations can follow in this mode to control other appliances or to again change the condition of the lamp of the example.

The identification of a person called can also be used within the system 10 to identify a party calling. To use the invention in this mode the programmer of the system enters the program mode again on the DTMF keyboard 38 by pressing the program key. The proper mode is then selected by the programmer as above to enter a person's name into the system. If, for example, the name "Fred" (FRE) is entered and followed by similar entries of "friends" of Fred, the CPU will store the list of friends. Each name that is entered into the system is followed by a digital voice recording speech module 33 of the programmers voice, announcing his friend's name into a telephone microphone connected to the system 10. Fred's name is now followed by his friend's name. John (for example) as JOH. Now when John calls in to the system he enters FRE then he follows it immediately with JOH. The CPU 32 searches for a match of FRE in memory 37a followed by JOH. A match of this combination now represents that a friend is calling by adding an additional trill note sequence to Fred's identifying ring. Fred thus knows before he has even answered the phone that a friend is calling. Fred now goes to the nearest telephone connected to the system and upon picking up the phone the off-hook condition is sensed by the telephone interface circuitry 10a and interpreted by the CPU through the CPU data port 32 by way of program control. The CPU controls the speech module to say "John is calling" and Fred may enter a 9 on the telephone to link the call. The nine entry signifies to the CPU by way of program control that the connect relay should be activated to connect the local line to the incoming telephone line.

Since it includes a computer, i.e., the MPU 43 as a component of the circuit, the receiver 26 has special encoding/decoding features which allow it to be very selective. When the receiver is first plugged in, or when power is applied to it, the MPU 43 lights a light emitting diode 43a which indicates that there has been a loss of power and that a new control signal must be sent to it from the central processing unit 31. Upon powerup, the central processing unit sends a code out of the AC modulator interface 40, which is decoded by the ringer-/appliance controller receiver 26. This first code received by a ringer/appliance controller receiver 26 is an identifying password number which allows the receiver 26 to respond to codes sent by that particular transmitter and is stored in the MPU 43 memory to be compared with each following command code. If the stored code does not match the leading code of subsequent command codes it is ignored. This improves the control accuracy and deters unauthorized access. The chance of an unauthorized person gaining access is limited to selecting one correct digital code out of several million codes. In contrast, other presently known AC appliance control systems can achieve only a one out of a few hundred rejection rate. The MPU 43 in the ringer/appliance controller receiver monitors for "weak signal areas", i.e., areas having excessive radio interference and/or electromotive interference. When the codes received are inconsistent and do not match previously sent codes, the MPU 43 lights the "bad signal" light 43a which tells the user that the present location is a weak or noisy signal area. Also when this "bad signal" condition exists, the MPU switches a tuning capacitor 43b in or out of the tuning filter circuit to effectively increase the pass band and allow for auto tuning.

All appliance control codes sent by central processing unit are updated and periodically re-transmitted to all appliances that are connected to the ringer/appliance controllers. Such updating insures that appliances attached are in their proper mode and faulty control is eliminated.

In some instances the integrated circuit is replaced with a conventional available battery backup memory system. This type memory has a built in clock feature which allows timed appliance control that is to say, that the programming allows appliances in the home to be turned on or off at a predetermined time.

The methods of communication (recipient or appliance addressability) used in this system allow greater convience in security systems. As in the memory dial mode previously described a smoke detector or security device can be connected to the internal telephone line. When an emergency situation arises the alarm device switches onto the internal telephone system and dials a "six", for example, which initiates the memory dial mode as described above. The device then immediately dials "F I R E", for example, which causes the system to dial a preprogrammed emergency number.

After the call is detected as answered, the invention dials a DTMF code to the security agency computer which would notify the agency of the emergency address.

With memory 37 and CPU 31 a user may call into his system from an external telephone and access the "AUTO PATCH" mode by entering a 10 on the remote telephone DTMF keyboard. This is decoded by the DTMF E/D module and interpreted by way of program control in the CPU to mean that the caller wants to enable the AUTO PATCH mode. The CPU 32 then controls the speech module 33 to say "enter access code" after which the caller enters his access code on an external DTMF keypad. If this code matches the preprogrammed code, as described earlier, the CPU 33 controls the speech module to say "enter number". The caller then enters the number on the external DTMF keypad which is decoded by the DTMF E/D 30 module and is stored in memory by the CPU. The CPU then controls the relay switches in the telephone interface 10a to flash the phone line to switch the main telephone company switch to an alternate call conferencing line. (This line must be subscribed to by the owner or user of the invention.) The CPU then dials the telephone number and follows with another flash of the connecting relay switch in telephone interface section 10a which causes both the caller and the new called line to be patched together.

By adding optional memory 37a the system can be used to perform CALLER ANNOUNCEMENT. After the caller has identified who he would like to speak to as described in the example using Fred, the caller will be asked to identify themself vocally. The CPU 31 under program control then controls the speech module to record that announcement. This speech is converted into digital code and stored into memory 37a for recall. When, for example, Fred hears his identifying ring he goes to any telephone connected to the system and upon answering the telephone an off-hook signal is received by the CPU 31 which then controls the speech module to playback that recorded code, which is the callers voice, through the telephone interface section 10a. This voice is heard over the telephone by Fred and now he may know who the caller is before he pushes 9 on the telephone DTMF keypad 38 to connect with the incoming call. Fred also has the option to hang up and ignore the call if he so desires.

Another method may also be implemented through an available input of the data port 36. An alarm system can be connected to the invention by way of a switch or number of switches (not shown) connected in a series fashion between the power supply ground and data port 36. When any switch is opened the series loop is broken and the data port 36 goes to a high state which is detected, by way of program, by the CPU 31. When this alarm condition is sensed the computer notifies the appropriate security agency in the manner previously described.

With the system of the invention it is possible to utilize a unique and advantageous method of leaving and retrieving messages. Thus, a caller having been told by the system that the person they wish to speak to is not available is further advised by the speech module 33 that if he would like to leave a message for that person to dial "1" and "*", for example, and wait for the beep. If the user presses that key sequence the DTMF decoder 30 places signals on the lines connected to the data port 32 which is received by the CPU 31. The CPU, by way of program, then places signals on the address/data lines to the input/output port which causes the DTMF encoder 30 to generate signals which create an audio beep tone on the telephone lines and which signals tell the caller to leave a message. The message given by the caller on the line is received by an Analog to Digital Converter (which is a standard item of manufacture) where the voice is reduced to digital code which is stored in ram 37a by the computer. When the message is completed or after a predetermined period of time has passed the line is disconnected in the usual fashion by the CPU 31. Retrieval of the message is accomplished by calling into the system or by picking up any internally connected telephone and dialing a "1" and "*". This dialed sequence is received by the CPU 31 through the DTMF decoder 30 in the usual fashion and by way of program the CPU 31 sends data to the speech synthesizer circuits of speech module 33 to set up oscillators to generate voice tones which say "enter name". The user then enters his name, as previously described, and this is received in the manner previously described. When the name is received and matched to a name pre-programmed into the system the system requests an access code. This particular access code prevents an unauthorized user from getting messages. After the name and access code are given in the usual fashion the CPU 31 sends the stored digital voice code to the speech synthesizer circuitry which generates the analog signals to sound back the message that was given. The user may erase the messages by entering "1", "*" and "#" after the message has been retrieved. When the proper sequence of DTMF numbers is received by the CPU 31 the message is erased by the CPU from ram memory 37a under program control. The user then hangs up and the invention returns to a command wait state.

Voice directed programming is available and when used simplifies operation of the system. Such programming is activated when the user pushes the "program" key on the DTMF keyboard 38. When this key is pressed the CPU 31 receives the signal through data port 32 and by way of program control gathers voice data which is transferred to the speech synthesizer of speech module 33 through data port 36. The speech synthesizer then sets up internal oscillators and amplifiers to say "enter access code", for example, which is heard over the internal system telephone. The dialogue that is thereafter generated by the speech synthesizer is dependent upon the mode which gets selected and the steps necessary to accommodate that program.

The identifying phone controller 10 continually monitors telephone line status and "listens" for DTMF or rotary data that may be present on the telephone line to which it is connected. This, together with its ability to control the telephone line status as well as codes sent to the additional AC line communication link, i.e., ringer-/appliance controller receiver 26 allows the system to perform many other functions. Identification of a person or appliance by name allows greater flexibility in that it is not necessary to remember a code number or to have to go to a specific device to enter a specific code to actuate a feature. All features become available on all telephones connected to the system, and with identification being simplified to a common or given name. It becomes simple to call Fred by his own name "F R E" or to turn on a lamp by dialing the first three letters as "L I G". While three letters are here disclosed as providing the desired entry data, it will be apparent that four or even more such characters could be required, if desired.

With this system described a great many functions can be obtained that are not available with previously known telephone systems. In the present system each of the telephones connected to the system will have all of the following features:

(1) single button hold;
(2) clear line intercom with all-call paging;
(3) call directing which allows specific addressee calls to be directed, without interfering with calls to other potential addressees;
(4) memory dialing;
(5) last number dialing;
(6) one button emergency dialing;
(7) automatic dialing;
(8) optional use of access codes to limit unwanted callers;
(9) optional use of access codes to limit use of long distance calls;
(10) appliance control of appliances attached to the system through the ringer/appliance controller receiver;
(11) timed appliance control which may be activated by the CPU 31;
(12) ability to read utility meters without interferring with human activity;
(13) ability to check on appliance status with a simple phone call;
(14) a message system that allows a message to be directed to a particular individual and with only a person having the proper access code being able to retrieve the message;

(15) a system that allows a personal computer to be connected to monitor appliance and telephone activities as well as to change central data;
(16) a system that can be key locked to prevent unauthorized user program changes;
(17) a system that can be provided with a power failure backup that will sustain the system memory for several days;
(18) a system that identifys a friendly caller;
(19) a system that announces a caller in the caller's own voice; and
(20) incorporates a modular telephone adapter to connect an outside call from a normally wired internal telephone system.

The identifying telephone system as heretofore described can be further utilized with a modified cordless telephone to provide additional functions for the system.

Figure 4A:
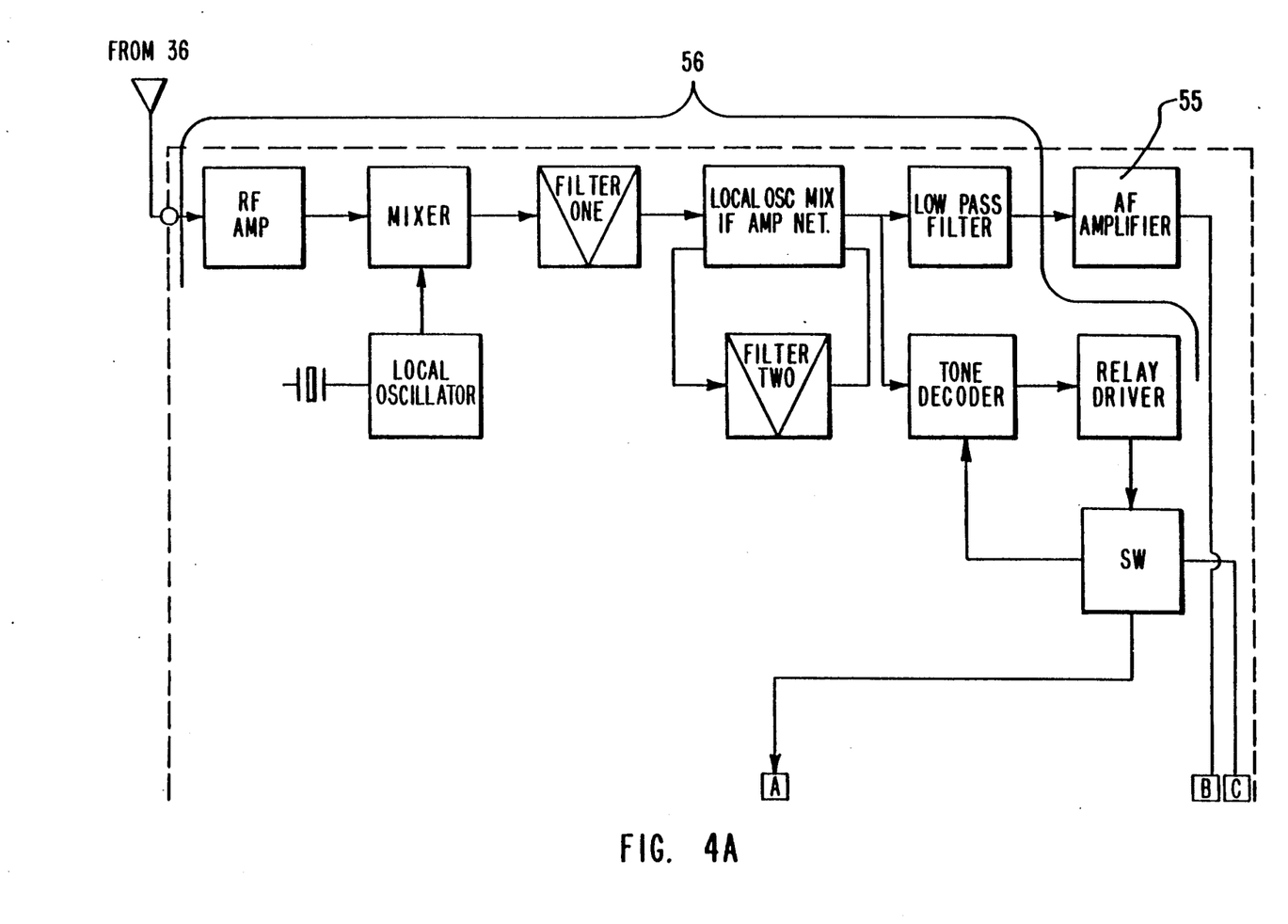
FIG. 4a, a block diagram showing a distinctive ring signal connection.
Figure 4B:
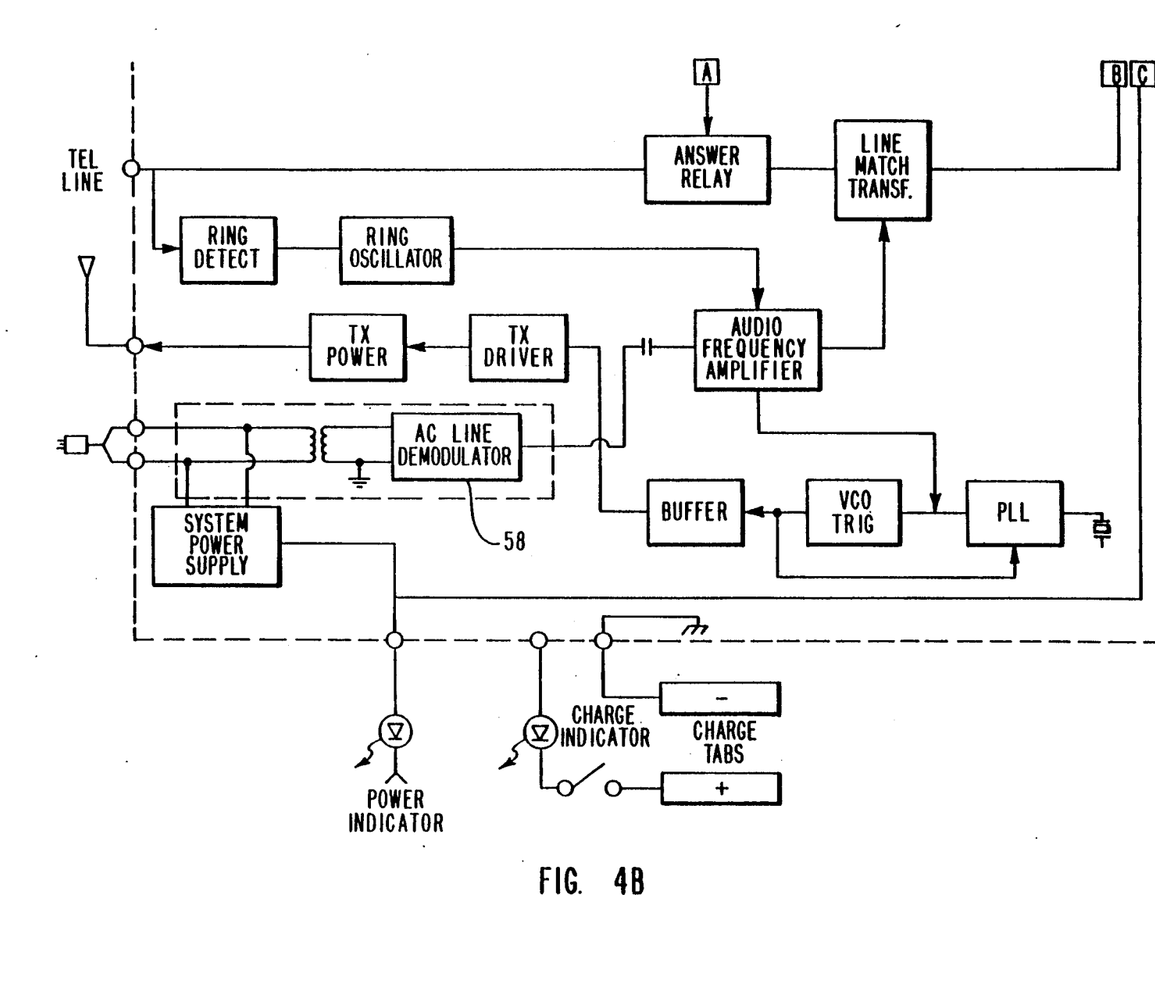
FIG. 4b a further block diagram showing a distinctive ring signal connection.

FIG. 4 shows, in block diagram form, two methods of modifying the cordless (portable) telephone with the present system.

As shown in FIG. 4, a direct connect method can be used. In this method the distinctive ring and AC controller signal from CPU Data Port 36 (FIG. 2) is coupled to the Audio Freguency Amplifier 55 through the circuitry 56 of a typical cordless telephone base station. This signal is then transmitted to the portable handset of the cordless telephone. The ring signal is then demodulated and decoded by a microcontroller 56, FIG. 5, which is one of the added components shown generally at 57, to the portable cordless handset shown generally at 58. Then a distinctive ring sequence, of the type heretofore discribed, is sounded through a speaker. A lockout feature achieved with the additional components shown at 57 is added to this telephone so that other modified telephones connected to the identifying telephone will be locked-out during a conversation. When the user answers the cordless telephone the identifying phone system senses the off-hook condition, as previously described and immediately transmits a control code which is received by all cordless telephones used on the system and that enables the cordless microcontroller to signal the lockout analog switches to stop the unused cordless telephone from transmitting or receiving until enabled by a hangup of the original cordless telephone or by the user pushing the intercom mode which would disable this privacy feature.

The other method of modifying the cordless telephone is basically the same as previously described. However, the ring and control signals are sent to the cordless base station over the AC wiring as previously described. An added AC line demodulator 58 added to the cordless telephone circuitry decodes the ring signal command and couples it to the Audio Frequency Amplifier of the Base Station, which then transmits the signal as previously described.

Figure 5:
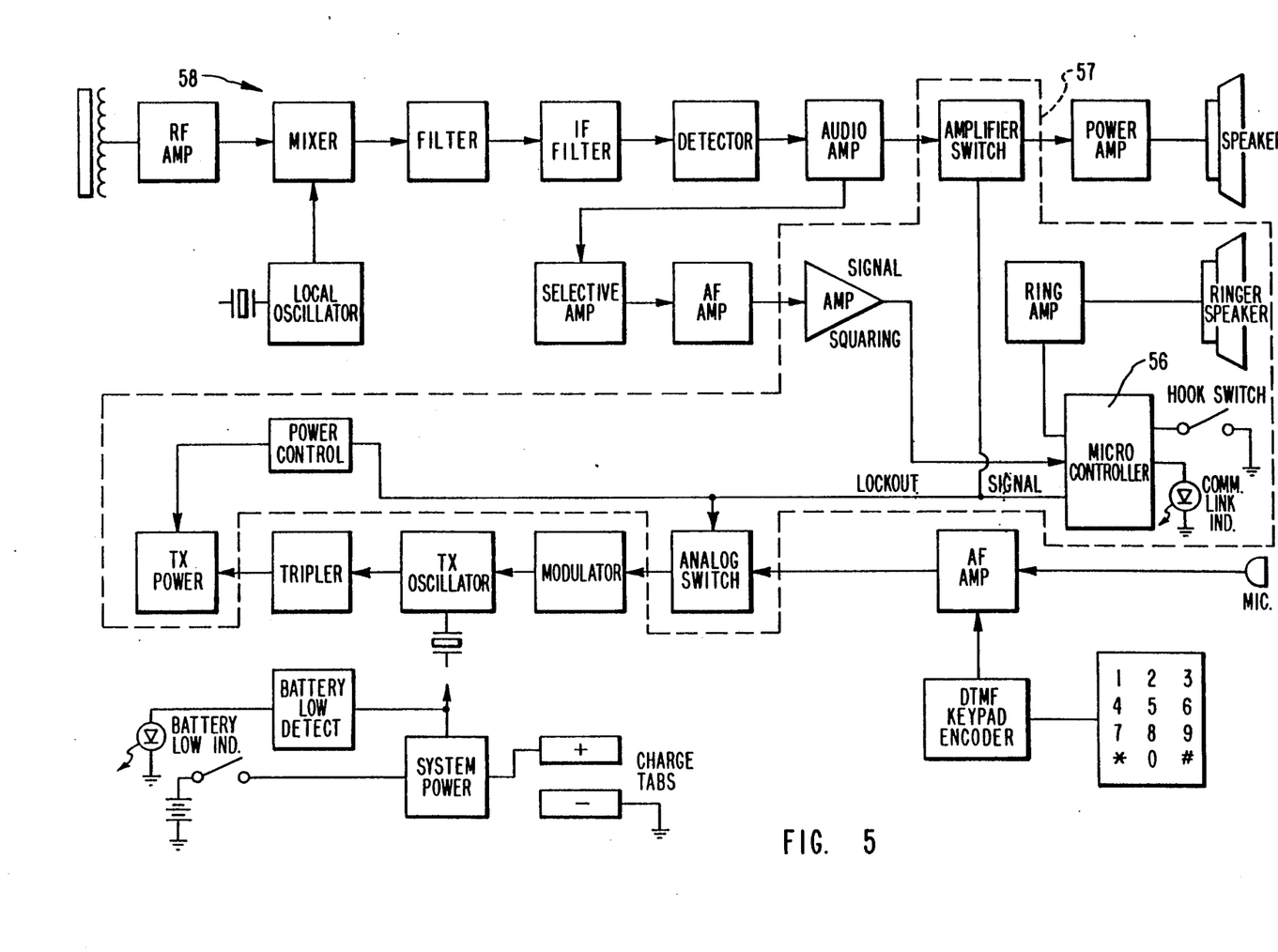
FIG. 5, a block diagram of a typical cordless portable telephone with distinctive ring and lock-out features.

All of the features of the Identifying Telephone System heretofore disclosed are now available on this modified cordless telephone. A user may carry a cordless telephone in his pocket and know, by the distinctive ring characteristic, if that call is for him, without having to first answer the call. The hold feature allows muting of the call so that the user can do an intercom, page or appliance control from wherever he wishes, within the range of the cordless telephone. After hearing a distinctive ring which is intended for the user, he can then put the cordless phone in an off-hook condition to hear the system voice synthesizer announce who is calling. The user of the system has the full option to accept this call or link up to the incoming call by pressing a DTMF link key (example key 9) on the portable telephone. The identifying system receives this link command and signals the hold relay to release and connect the outside call. Intercom use is similarly unique in that a user may pick up a cordless telephone and use the system intercom mode to summon another party, who is local to the system, to another telephone to complete the communication.

Such a system using all cordless telephones gives the user great advantages over the presently "wired" telephones because the user has total flexibility and control of incoming calls anywhere within the range of the cordless telephone. The system screens calls transparent to the user and lets the user know who the call is for and as an option, who the call is from.

Although a preferred form of our invention has been herein disclosed, it is to be understood that the present disclosure is by way of example and that variations are possible without departing from the subject matter coming within the scope of the following claims, which subject matter we regard as our invention.

What is claimed and desired to be secured by United States Letters Patent is:

1. An identifying telephone controller system comprising:
   a central processing unit (CPU) coupled to an AC wiring circuit;
   a speech synthesizer controlled by the central processing unit;
   a dual tone multiple frequency encoder/decoder (DTMF/E/D) connected to the central processing unit;
   a telephone interface connecting the dual tone multiple frequency encoder/decoder and speech synthesizer to an incoming telephone line and at least one receiving telephone;
   at least one ringer/appliance controller means connected to the AC wiring circuit, said at least one ringer/appliance controller means comprising a microprocessor unit (MPU), address select switches, oscillator means and a speaker;
   whereby an incoming call received by the central processing unit is responded to by the speech synthesizer and whereupon a subsequent code entered by a caller results in a signal code being annunciated by a speaker.

2. An identifying telephone controller system as defined in claim 1 wherein said at least one ringer/appliance controller means comprises an electrical outlet capable of receiving a plug of an electrically powered device and a relay operated by the MPU to control power to the electrical outlet.

3. An identifying telephone controller system as defined in claim 1 wherein the telephone interface is connected to the tip and the ring lines of the incoming telephone line.

4. An identifying telephone controller system as defined in claim 3 further comprising:
   a modular adapter for said at least one receiving telephone;
   a modular plug for said at least one receiving telephone and coupled to a modular adapter;
   means for connecting the tip and ring lines of said at least one receiving telephone to a modular plug; and A+ and A− lines interconnecting the interface with said at least one modular adapter, said at least one modular adapter interconnecting the tip and ring lines of the receiving telephone to the A+ and A− lines connected to the interface.

5. An identifying telephone controller system as defined in claim 2 wherein the telephone interface is connected to the tip and ring lines of the incoming telephone line and said system further comprises:
a modular adapter for said at least one receiving telephone;
a modular plug for said at least one receiving telephone and coupled to a modular adapter;
means for connecting the tip and ring lines of said at least one receiving telephone to a modular plug; and
A+ and A− lines interconnecting the interface with each modular adapter, each said modular adapter interconnecting the tip and ring lines of the receiving telephone to the A+ and A− lines connected to the interface.

6. An identifying telephone controller system as defined in claim 5 comprising:
a DTMF keyboard connected to the DTMF/E/D such that the central processing unit is capable of being programmed to acknowledge name and number data with DTMF data entered into the CPU by the DTMF keyboard.

7. An identifying telephone controller system as defined in claim 5 wherein the CPU is programmed to operate the speech synthesizer to respond to an incoming call by requesting that a predetermined number of letters of the name of a person called be entered through the keyboard of a caller's telephone.

8. An identifying telephone controller system as defined in claim 6, wherein the CPU is programmed with system memory to compare an incoming signal representative of a person called with codes programmed in the system memory and upon finding a match to provide a ringing signal corresponding to a ringing signal established for the person called through an amplifier and speaker of said at least one ringer/appliance controller means.

9. An identifying telephone controller system as defined in claim 6 wherein the CPU is further programmed to respond to a program signal from the keyboard of the telephone of an incoming call and a further code entered by said telephone that is compared with a code of the address select switches to send a coded signal to the MPU to activate an appliance responsive to a signal and coupled to the electrical outlet of said MPU.

10. An identifying telephone controller system as defined in claim 8 wherein at least one MPU is programmed to receive a signal from a detector and to thereupon send a corresponding signal to the CPU and wherein the CPU is programmed to send a dialing signal to the telephone of a proper recipient corresponding to the signal received from the detector and to provide additional data when said recipient telephone is answered indicative of the nature of the signal received from the detector.

11. An identifying telephone controller system as defined in claim 10 wherein the CPU is further programmed to operate the speech synthesizer such that the speech synthesizer provides the additional data.

12. An identifying telephone controller system as defined in claim 8 wherein the CPU is further programmed to operate the speech synthesizer to advise an incoming caller that a person called is not available and to ask the caller to enter a code if it is desired to leave a message and upon entry of the code to receive and store a message.

13. An identifying telephone controller system as defined in claim 11 wherein the CPU is further programmed to transmit the stored message from a first incoming caller to a second incoming caller upon entry of a code signal entered by the second caller and matched with the code signal previously entered by a CPU select input device for a person for whom the message is left.

14. An identifying telephone controller system as defined in claim 1 wherein the CPU is programmed to provide for voice directed programming upon actuation of a selected program key by a caller and to operate the speech synthesizer to advise said caller to select a program key when an incoming call is received.

15. An identifying telephone controller system as defined in claim 4 further comprising:
a DMTF keyboard connected to the DTMF/E/D;
whereby the CPU is programmed to acknowledge name and number data with DTMF data entered into the CPU through the DTMF keyboard.

16. An identifying telephone controller system as defined in claim 1 wherein the CPU is programmed to operate the speech synthesizer to respond to an incoming call by requesting that a predetermined number of letters of the name of the person called be entered through the keyboard of the caller's telephone.

17. An identifying telephone controller system as defined in claim 4 wherein the CPU is programmed to operate the speech synthesizer to respond to an incoming call by requesting that a predetermined number of letters identifying the person called be entered through the keyboard of the caller's telephone.

18. An identifying telephone controller system as defined in claim 4 wherein the CPU is programmed to compare an incoming signal representative of a person called with codes programmed using a CPU input select device and upon finding a match to provide a ringing signal corresponding to a ringing signal established for the person called through an amplifier and speaker of said at least one ringer/appliance controller means.

19. An identifying telephone controller system as defined in claim 8 wherein the CPU is programmed to compare an incoming signal representative of a person called with codes programmed using a CPU input select device and upon finding a match to provide a ringing signal corresponding to a ringing signal established for the person called through an amplifier and speaker of said at least one ringer/appliance controller means.

20. An identifying telephone controller system as defined in claim 1 wherein the CPU is programmed to respond to a program signal from the keyboard of the telephone of an incoming call and a further code entered by said telephone that is compared with a code of the address select switches to send a coded signal to the MPU to activate an appliance responsive to a signal and coupled to the electrical outlet of one said MPU.

21. An identifying telephone controller system as defined in claim 20 wherein at least one MPU is programmed to receive a signal from a detector and to thereupon send a corresponding signal to the CPU and wherein the CPU is programmed to send a dialing signal to the telephone of a proper recipient corresponding to the signal received from the detector and to provide additional data when said recipient telephone is answered indicative of the nature of the signal received from the detector.

22. An identifying telephone controller system as defined in claim 21 wherein the CPU is further programmed to operate the speech synthesizer whereby the speech synthesizer provides the additional data.

23. An identifying telephone controller system as defined in claim 22 wherein the CPU is programmed to receive incoming calls from outside telephones and to receive and store messages therefrom to be transmitted to a caller providing the CPU with a code to release such messages.

24. An identifying telephone controller system as defined in claim 23 wherein the CPU is programmed to receive an auto-dial code signal whereupon the CPU will periodically redial the last number dialed by a receiving telephone.

25. An identifying telephone controller system as defined in claim 23 wherein the CPU is programmed to contain telephone numbers corresponding to the names of the persons called, to receive a memory code signal from a receiving telephone, and a code corresponding to a person to be called and to periodically redial the telephone number corresponding to the name of the person called, until such call is completed and to then supply the signal to said at least one ringer/appliance controller means to cause said controller means to enunciate a signal for the party placing the call.

26. An identifying telephone controller system as defined in claim 1 further comprising means responsive to an access code input into the CPU to patch an incoming call to another line through a call conferencing means of a telephone system.

27. An identifying telephone controller system as defined in claim 26 wherein the CPU is programmed to compare an incoming signal representative of a person calling with codes programmed using a CPU input select device and upon finding a match to provide a ringing signal corresponding to a ringing signal established for the person calling through an amplifier and speaker of said at least one ringer/appliance controller means.

28. An identifying telephone controller system as defined in claim 27 wherein the CPU is programmed to control a speech module to announce who is calling over an internal phone system by way of an AC modulator interface or a telephone connected to said system.

29. An identifying telephone controller system as defined in claim 28 wherein the CPU is programmed to transmit signals over an AC line interface to said at least one ringer/appliance controlled means which will sound an off-hook indication through an amplifier and speaker of said at least one ringer/appliance controller means.

30. An identifying telephone controller system as defined in claim 28 wherein the CPU displays the status of programmed data on an accompanying visual display.

31. An identifying telephone controller system as defined in claim 1 further comprising a real time clock circuit capable of controlling the on/off condition of appliances on a timed basis.

32. An identifying telephone controller system as defined in claim 27 wherein said system is programmed to record a caller's voice and notify the intended recipient of the identity of the caller by way of playback of that same voice before the recipient answers that call.

* * * * *